Sept. 27, 1932. K. BASSLER 1,879,027
INTERNAL COMBUSTION ENGINE AND THE LIKE
Filed June 26, 1930
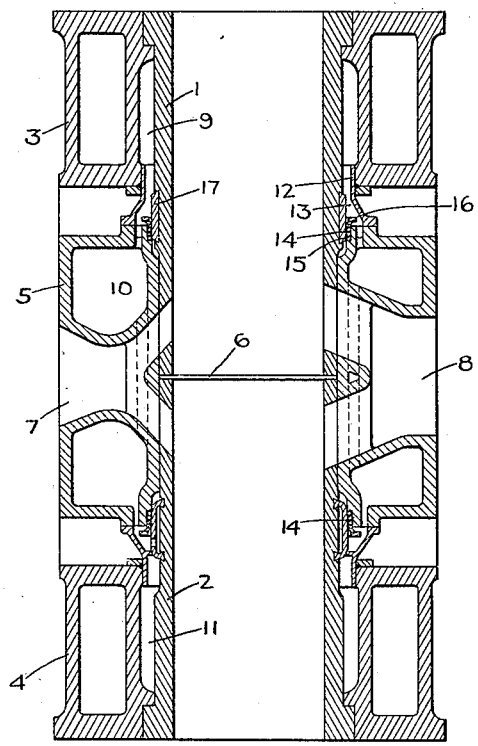
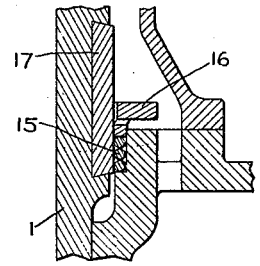
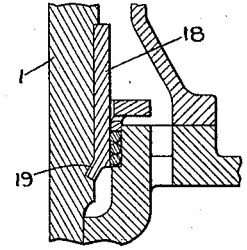
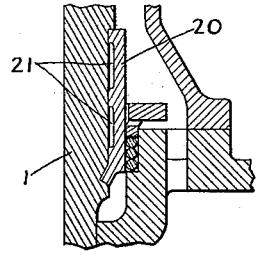
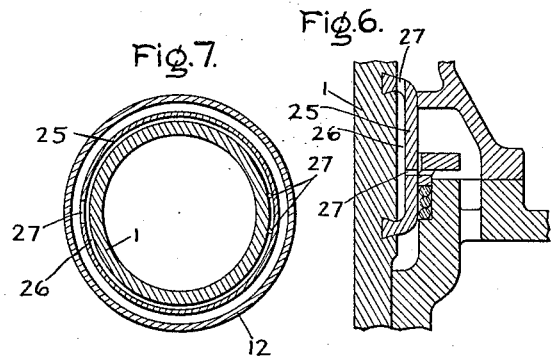
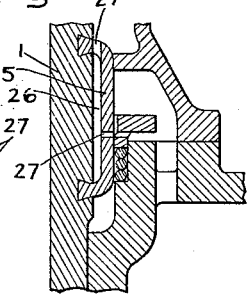
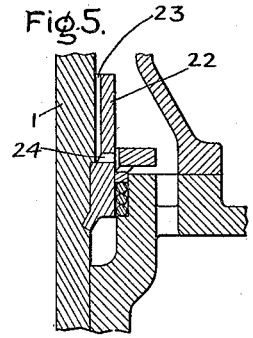
Inventor:
Kurt Bassler,
by Charles A. Mullen
His Attorney.

Patented Sept. 27, 1932

1,879,027

UNITED STATES PATENT OFFICE

KURT BASSLER, OF BERLIN-WESTEND, GERMANY, ASSIGNOR TO GENERAL ELECTRIC COMPANY, A CORPORATION OF NEW YORK

INTERNAL COMBUSTION ENGINE AND THE LIKE

Application filed June 26, 1930, Serial No. 464,027, and in Germany June 27, 1929.

It often happens that hot machinery parts have to be packed against the surrounding spaces by means of a packing made of organic substances such as, for instance, rubber. Thus, for example, it is usual to pack the cylinder liners of internal combustion engines, more particularly of two stroke cycle engines, against the cylinder frames and their cooling-water spaces by placing cords or rings made of organic substances, either at a low initial tension on the liners, or into grooves turned in the liners, and then, with the cords or rings in place, introduce the liners into the cylinder frame where the cords or rings come to lie against a corresponding heel or projection on the frame. Sometimes the rings or cords are housed in annular grooves in the cylinder frame and are pressed together by means of stuffing box follower rings. In all these forms of construction the packing rings made of organic substances lie close to the liners. If now these points are particularly hot, owing to insufficient cooling, or, in the case of two stroke cycle engines, with good cooling, owing to the points being in the vicinity of the exhaust ports, the packing rings become hard and brittle after a fairly short period and lose their tension. The result is that the packing is no longer tight, thus giving rise to the danger of cooling water coming into the cylinder or of combustible gases passing into the cooling water, both of which are undesirable.

According to the present invention, at all those packing points, where the packing material, made of organic substances, would come into contact with walls that are too hot, the packing material is separated from the walls by means of a good conductor of heat, such as copper, aluminum and the like, which is rigidly connected to the hot machinery part. This conductor of heat, being in close contact with the hot wall, conducts a portion of the heat of the wall away towards the outside, so that the conductor of heat assumes a temperature lower than that of the hot wall. Consequently, the packing material, lying close up against the conductor of heat, is protected. The conductance of the heat is increased when the conductor of heat is either entirely surrounded by a good cooling medium, such as cooling water, or is at least partially brought into contact with same.

Referring to the drawing, Fig. 1 shows by way of example a longitudinal, sectional view of a two-stroke internal combustion engine provided with a packing construction embodying my invention; Figs. 2 to 6 are detail sectional views, on an enlarged scale, showing various arrangements for carrying out the invention, the arrangements shown in Fig. 2 being similar to that shown in the upper portion of Fig. 1; and Fig. 7 is a sectional view through the structure shown in Fig. 6.

Referring to the drawing, 1 indicates the upper cylinder liner and 2 indicates the lower cylinder liner of a double acting two-stroke internal combustion engine, the liners being inserted into the end casing structures 3 and 4 and the central casing structure 5. The cylinder liners are spaced apart somewhat as is indicated at 6, in order to permit of their expansion. 7 indicates the scavenging ports and 8 the exhaust ports for the cylinder. Between the casing structure and the liners are water cooling spaces 9, 10 and 11 which are connected together by annular rings 12 which define connecting passages 13. In order to prevent leakage of cooling water from the cooling water spaces into the scavenging and exhaust ports 7 and 8, stuffing boxes 14 are provided, each comprising packing rings 15 held by follower rings 16. Two stuffing boxes are shown in Fig. 1 of the drawing.

For protecting the packing rings 15 from the relatively high temperature of the cylinder liner there is provided, according to the present invention, intermediate protecting rings or inserts 17 formed of some good heat conducting material such as copper, aluminum and the like. Referring to Fig. 2, it will be seen that the packing rings 15 engage the lower portion of the protecting ring 17, the protecting ring being located between the packing rings 15 and the cylinder liner 1. The upper portion of the protecting ring is exposed directly to the water cooling chamber so that heat will be absorbed rapidly from it. As a result, the protecting ring 17 will be maintained relatively cool, and may be considerably cooler than the adjacent portion of the liner. In substance, the upper portion of the ring 17 serves as a good heat conducting medium for carrying heat away from the portion with which the packing rings 15 engage. In the arrangement shown in Fig. 2 the ring 17 is made in several pieces and is secured in a dove-tail annular groove in the liner 1.

Fig. 3 shows an arrangement similar to that shown in Fig. 2, except that the intermediate protecting ring 18, corresponding to the protecting ring 17 of Fig. 2, is in the form of a solid ring which is drawn hot onto the cylinder liner, the lower end 19 being imbedded in an annular groove in the cylinder liner.

The arrangement shown in Fig. 4 is similar to that shown in Fig. 3 except that the protecting ring 20, corresponding to the protecting ring 18 of Fig. 3, is relieved as is indicated at 21 so as to have but limited contact with the cylinder liner 1, this arrangement serving to minimize the transfer of heat from the wall cylinder liner to the ring.

The modification shown in Fig. 5 is similar to that shown in Fig. 4 except that the upper end of protecting ring 22, corresponding to the protecting ring 20 of Fig. 4, is spaced from the cylinder wall as is indicated at 23 and is provided with an opening 24 to permit of the circulation of cooling liquid between the upper portion of the ring and the cylinder liner 1.

In the modification shown in Figs. 6 and 7, the intermediate protecting ring 25 is connected to the cylinder liner at its two ends only whereby there is provided an annular space 26 through which cooling water may circulate by way of the openings 27. This construction is similar to that shown at the lower portion of Fig. 1.

In each of the modifications illustrated, it will be seen that there is provided between the packing rings, which may be formed of an organic substance, and the cylinder liner, an intermediate protecting ring which is a good conductor of heat and which serves to maintain a surface of lower temperature with which the substance of the packing rings engages. As a result, the packing rings are protected from the high temperature of the cylinder liner.

In accordance with the provisions of the patent statute, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:

1. The combination with a machine part which is subjected to high temperature, a second machine part which surrounds it, and a packing ring between the two parts, of an intermediate protecting ring of good heat conducting material located between the packing ring and the first named part and with which the packing ring engages, said protecting ring projecting beyond said packing ring, and means for cooling the projecting part of said packing ring.

2. The combination with a machine part which is subjected to high temperature, a second machine part which surrounds it, and a packing ring between the two parts, of an intermediate protecting ring of good heat conducting material located between the packing ring and the first named part and with which the packing ring engages, said intermediate ring extending beyond the packing ring to provide a heat dissipating surface.

3. The combination with a machine part which is subjected to high temperature, a second machine part which surrounds it, and a packing ring between the two parts, of an intermediate protecting ring of good heat conducting material located between the packing ring and the first named part and with which the packing ring engages, said intermediate ring being in part spaced from said first named machine part and extending beyond said packing ring whereby it is adapted to be brought into contact with a cooling medium.

4. The combination with a machine part which is subjected to high temperature, a second machine part which surrounds it, and a packing ring between the two parts, of an intermediate protecting ring of good heat conducting material located between the packing ring and the first named part and with which the packing ring engages, said intermediate ring being in part spaced from said first named machine part and being provided with openings for the circulation of a cooling medium.

5. The combination with a machine part which is subjected to high temperature, a second machine part which surrounds it, and a packing ring between the two parts, of an intermediate protecting ring of good heat conducting material located between the packing ring and the first named part and with which the packing ring engages, said intermediate ring extending beyond the packing ring to provide a heat dissipating surface, and means whereby said surface is subjected to the action of a cooling medium.

6. The combination with a machine part which is subjected to high temperature, a second machine part adjacent thereto, a packing substance between the two and a wall defining a cooling chamber with the first named machine part, of an intermediate protecting layer of good heat conducting material located between the packing substance and the first named part and in thermal engagement with the first named part and extending beyond said packing substance into said cooling chamber whereby heat transferred from said first named machine part to said protecting layer is transferred to a cooling medium passed through said cooling chamber.

In witness whereof, I have hereunto set my hand this 16th day of June, 1930.

KURT BASSLER.